Feb. 9, 1937.  A. W. STEVENS  2,069,783
VALVE MECHANISM
Filed Oct. 3, 1934  2 Sheets-Sheet 1
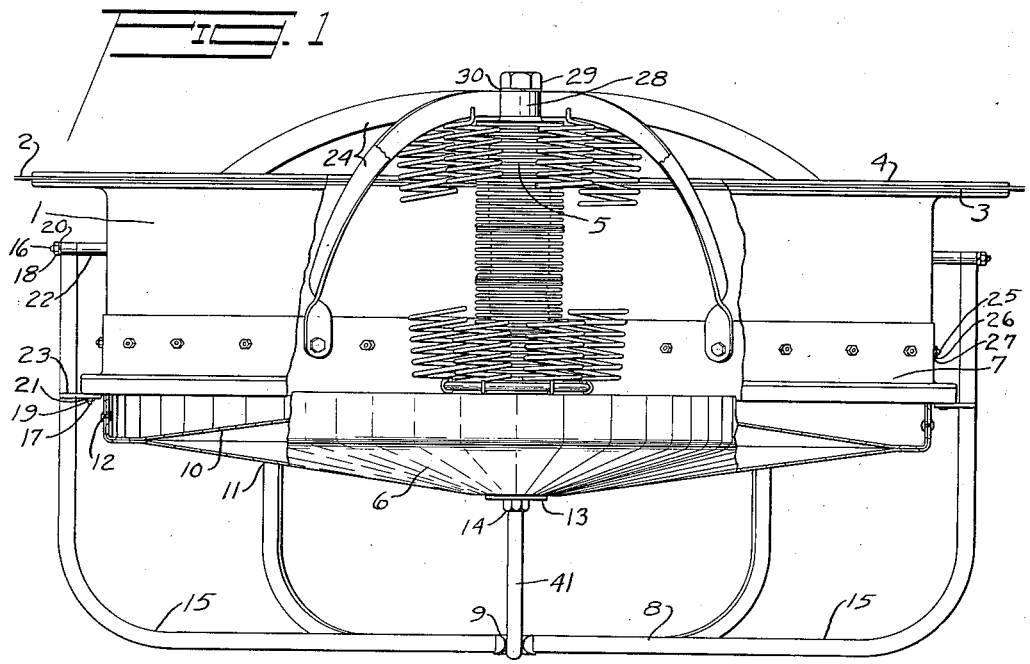
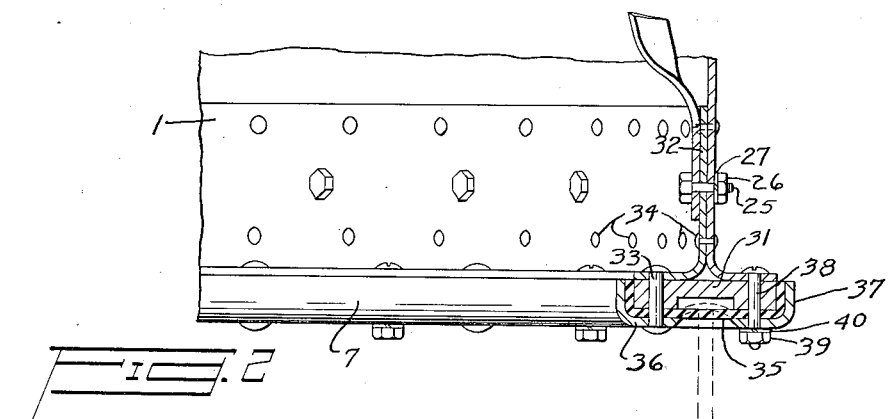
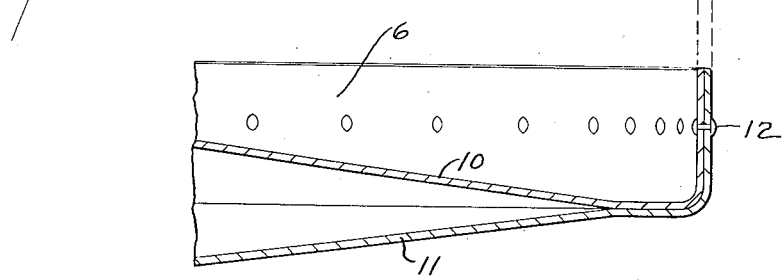
INVENTOR
ALBERT W. STEVENS
BY Francis J. Dagderwerken
and
Clade Koontz
ATTORNEYS Feb. 9, 1937.  A. W. STEVENS  2,069,783
VALVE MECHANISM
Filed Oct. 3, 1934  2 Sheets-Sheet 2
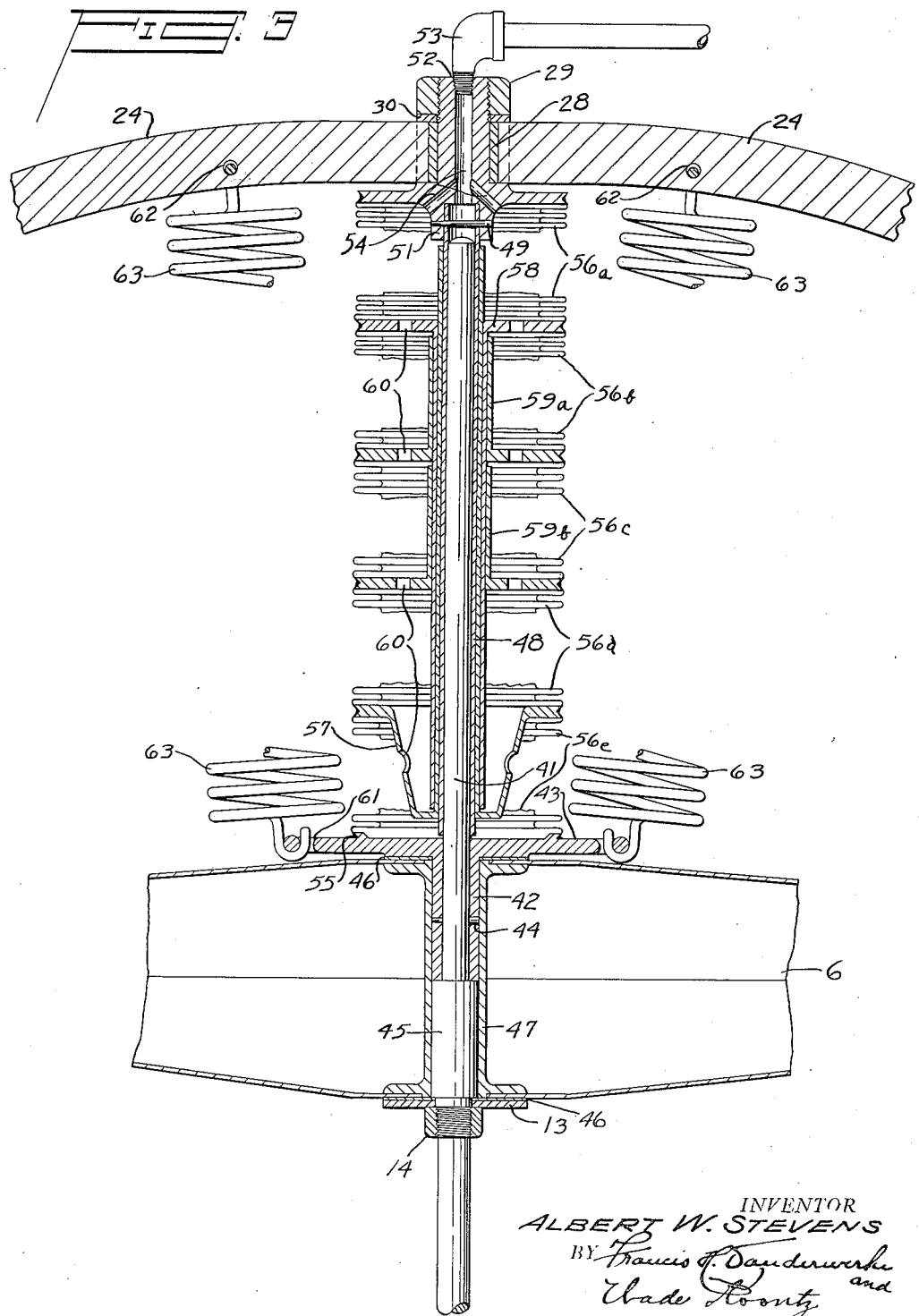
INVENTOR
ALBERT W. STEVENS Patented Feb. 9, 1937

2,069,783

UNITED STATES PATENT OFFICE 2,069,783

VALVE MECHANISM

Albert W. Stevens, Dayton, Ohio

Application October 3, 1934, Serial No. 746,662

6 Claims. (Cl. 137—139)

(Granted under the act of March 3, 1883, as amended April 30, 1928; 370 O. G. 757)

The invention described herein may be manufactured and used by or for the Government for governmental purposes, without the payment to me of any royalty thereon.

This invention relates to valves of the disc type and is particularly adapted for installation upon lighter-than-air craft designed for operation at high altitudes.

Recent flights into the stratosphere have necessitated employment of air-tight gondolas for the purpose of protecting the navigators from the extremely rare atmosphere. The aforesaid protection renders employment of sliding connections to "pull cords" highly unsatisfactory.

It is a principal object of my invention to provide remotely controlled fluid actuated means of great simplicity for regulating gas outlet.

It is another object of my invention to assure from minimum to maximum gas escapage with the same minimum of control effort.

It is a further object of my invention to assure valve operation under the most adverse of temperature changes.

With the foregoing and other objects in view, which will appear as the description proceeds, the invention consists of certain new and novel improvements in valve mechanism, which will be hereinafter more fully illustrated and described in the accompanying drawings and more particularly pointed out in the appended claims.

Referring to the drawings, in which numerals of like character designate similar parts throughout the several claims:

Fig. 1 is a side elevation of my invention in partial cross-section;

Fig. 2 shows an enlarged portion of Fig. 1, with the "valve disc" partially open; and Fig. 3 is a sectional view through the vertical axis of the "valve operating mechanism."

In Fig. 1, a valve frame I is fixedly secured to the bottom of a fluid-pressure receptacle, such as an envelope 2, by means of a gasket 3 and a clamping ring 4. The central portion of the valve frame I has been cut away to indicate a valve operating mechanism 5 by means of which a valve disc 6 is normally "closed" against a valve seat 7. A guide stem 41, (better shown in Fig. 3) projecting from the bottom of the valve disc 5, slidably engages a longitudinally slotted ring 9 forming the central portion of a guide stem support 8. The valve disc 6 consists of upper and lower members 10 and 11, separated at their center portions by a spacer 47 (shown in Fig. 3) and secured together at their peripheries by rivets 12. The valve disc 6 is assembled to the bottom portion of the valve operating mechanism 5 by means of a washer 13 and a lock nut 14. Six arms 15 of the guide stem support 8 are secured to the valve frame I by means of bolts 16 and 17, nuts 18 and 19 and lock washers 20 and 21, in combination with six spacer tubes 22 and six brackets 23 fixedly attached to the aforesaid arms 15. The valve operating mechanism 5 is secured to the valve frame I by means of six stay members 24. The outer extremities of the latter members are secured to the lower inner surface of the valve frame I by means of bolts 25, nuts 26 and lock washers 27, while the inner extremities thereof are welded to a longitudinally slotted ring 28. The upper extremity of the valve operating mechanism 5 is secured to the ring 28 by means of a lock nut 29 and lock washer 30.

In Fig. 2, the valve disc 6 is shown partially withdrawn from the valve seat 7. The latter is composed of a seating ring 31 of shallow U-shaped cross-section secured to the valve frame I and an L-shaped reinforcing ring 32 forming part thereof, by means of rivets 33 and 34. Over the seating ring 31 is stretched an annular gasket 35 of flexible material, which is further held in place by means of L-shaped retaining rings 36 and 37. Bolts 38, nuts 39 and lock washers 40 are employed to complete the "seat" assembly, which is fluid-tight upon impact and slight depression of the upper outer surface of the valve disc 6.

In Fig. 3, the longitudinal slotted ring 28 and valve operating mechanism 5 secured thereto are shown in cross-section. The innermost member of the latter consists of a guide stem 41 secured to a downwardly extending boss 42, of a spider 43, by means of a pin 44. The guide stem 41 is provided with a shoulder 45, in continuation of the boss 42. Two gaskets 46 are slipped over the guide stem 41, on either side of the valve disc 6, and the latter is then drawn up against the bottom of the spider 43 by means of the washer 13 and lock nut 14. It will be noted that a spacer 47 has been inserted between the inner surfaces of the upper and lower members 10 and 11 of the valve disc 6, prior to sub-assembly of the latter, by means of the rivets 12.

The guide stem 41 is steadied as follows. As has been previously stated, the lowermost extremity of the aforesaid stem slidably engages the longitudinally slotted ring 9 of the guide stem support 8. That portion of the guide stem 41 which projects above the spider 43 slidably engages a telescoping tube 48. The lower end of the tube 48 just clears the top surface of the spider 43, when the valve disc 6 is in the "closed position." The upper end of the tube 48 is secured by means of a pin 49 to a boss 50 projecting from the under-side of a flanged fitting 51, forming the top of the valve operating mechanism 5. Through the aforesaid part arrangement, whether contracted or expanded, the guide stem 41 and telescoping tube 48 always remain coaxial with the common vertical axis of the valve frame 1 and the valve disc 6.

The flanged fitting 51 is provided with a pipe thread 52 into which is secured a pipe L or other suitable fitting 53. Passages 54 connect the bottom surface of the aforesaid flanged fitting with the fitting 53. It will be noted that a considerable gap exists between the flanged fitting 51 and a shoulder 55 provided upon the upper surface of the spider 43. For this reason a single sylphon element joining the aforesaid flanged fitting and shoulder is not feasible. There are provided as supports for the five sylphon elements 56a through 56e, flanged guide tubes 57, 58 and 59a and 59b. It will be noted that the "tube" 48 is freely slidable upon the guide stem 41, the "tube" 57 freely slidable upon the "tube" 48, the "tube" 58 freely slidable upon the "tube" 57 and the "tubes" 59a and 59b freely slidable upon the "tube" 58. Through the aforementioned structural arrangement, the five sylphon elements 56a through 56e are maintained in continuous alignment. The outer edges of each element are spun down and soldered to their respective supporting flanges. All sylphons are interconnected by means of passages 60. Six holes 61 are provided in the spider 43 and one hole 62 in each of the stay members 24 for insertion of six seating springs 63. The operating mechanism is normally positioned with the valve disc 6 against the valve seat 7, as shown in Figs. 1 and 3.

Expansion of the sylphon elements 56a through 56e, effecting simultaneous opening of the valve disc 6, is controlled by means of a fluid pressure supply located within the gondola housing the balloon navigators. In a recent flight my invention was connected with readily detachable oxygen tanks by means of a $\frac{3}{16}$ inch rubber hose 375 feet in length. Despite the fact that the valve hose was twisted some forty turns during flight, due to similar turning of ropes to which it was lashed, the valve was successfully operated in the neighborhood of 150 times. One oxygen tank is sufficient to operate the valve approximately 100 times, under a pressure of 21 pounds per square inch, maximum. Two oxygen tanks were still in reserve at the conclusion of the above flight. It is worthy of note that my invention entirely eliminates the necessity of mechanical movement through the hull of the gondola housing during the often repeated process of regulating gas outlet.

I claim:

1. A valve mechanism comprising in combination with a remotely controlled fluid-pressure supply, a valve frame having a seat and stay members disposed in sets above and below the aforesaid seat, a valve disc adapted to contact said valve-seat, seating springs coupling one set of said stay members to said valve disc for normally retaining the latter in sealed contact with said valve-seat, and fluid operated means secured to one set of said stay members for inducing downward movement of said valve disc towards said lower stay members such that said valve disc is caused to separate from said valve-seat.

2. A valve mechanism comprising in combination with a remotely controlled fluid-pressure supply, a valve frame having a seat and stay members disposed in sets above and below the aforesaid seat, a valve disc adapted to contact said valve-seat, seating springs coupling the upper set of said stay members to said valve disc for normally retaining the latter in sealed contact with said valve-seat, and fluid operated means secured to the upper set of said stay members for inducing downward movement of said valve disc towards said lower stay members such that said valve disc is caused to separate from said valve-seat.

3. A valve mechanism comprising in combination with a remotely controlled fluid pressure supply, a valve frame having a seat and stay members disposed in sets above and below the aforesaid seat, a valve disc having a fixed guide stem projecting from top and bottom coaxial with the longitudinal axis of said valve frame, a fitting centrally secured to the upper set of stay members having a downwardly projecting tubing adapted to slidably receive said top guide stem portion, a ring centrally secured to the lower set of stay members adapted to slidably receive said bottom guide stem portion, seating springs coupling the upper set of said stay members to said valve disc for normally retaining the latter in sealed contact with said valve seat, and fluid operated means secured to said centrally disposed fitting for inducing downward movement of said valve disc towards said lower stay members such that said valve disc is caused to separate from said valve seat.

4. A valve mechanism comprising in combination with a remotely controlled fluid pressure supply, a valve frame having a seat and stay members disposed in sets above and below the aforesaid seat, a valve disc having a fixed guide stem projecting from top and bottom coaxial with the longitudinal axis of said valve frame, a fitting centrally secured to the upper set of stay members having a downwardly projecting tubing adapted to slidably receive said top guide stem portion, a ring centrally secured to the lower set of stay members adapted to slidably receive said bottom guide stem portion, seating springs coupling the upper set of said stay members to said vale disc for normally retaining the latter in sealed contact with said valve-seat, and an assembly of interconnected sylphon elements fixed at its upper end to said centrally disposed fitting for inducing downward movement of said valve disc towards said lower stay members such that said valve disc is caused to separate from said valve seat.

5. A valve mechanism comprising in combination with a remotely controlled fluid pressure supply, a valve frame having a seat and stay members disposed in sets above and below the aforesaid seat, a valve disc having a fixed guide stem projecting from top and bottom coaxial with the longitudinal axis of said valve frame, a fitting centrally secured to the upper set of stay members having a downwardly projecting tubing adapted to slidably receive said top guide stem portion, a ring centrally secured to the lower set of stay members adapted to slidably receive said bottom guide stem portion, seating springs coupling the upper set of said stay members to said valve disc for normally retaining the latter in sealed contact with said valve-seat, and an assembly of interconnected, longitudinally disposed sylphon elements fixed at its upper end to said centrally disposed fitting for inducing downward movement of said valve disc towards said lower stay members such that said valve disc is caused to separate from said valve seat.

6. A valve mechanism comprising in combination with a remotely controlled fluid pressure supply, a valve frame having a seat and stay members disposed in sets above and below the aforesaid seat, a valve disc having a fixed guide stem projecting from top and bottom coaxial with the longitudinal axis of said valve frame, a fitting centrally secured to the upper set of stay members having a downwardly projecting tubing adapted to slidably receive said top guide stem portion, a ring centrally secured to the lower set of stay members adapted to slidably receive said bottom guide stem portion, seating springs coupling the upper set of said stay members to said valve disc for normally retaining the latter in sealed contact with said valve-seat, and an assembly of interconnected, longitudinally disposed sylphon elements coaxial with the longitudinal axis of said valve frame fixed at its upper end to said centrally disposed fitting and completely housing said downwardly projecting tubing and encased top guide stem portion for inducing downward movement of said valve disc towards said lower stay members such that said valve disc is caused to separate from said valve seat.

ALBERT W. STEVENS.